US005532909A

United States Patent [19]

Ban et al.

[11] Patent Number: 5,532,909

[45] Date of Patent: Jul. 2, 1996

[54] REFLECTOR FOR A VEHICULAR LAMP AND METHOD OF PRODUCING A DIE THEREFOR

[75] Inventors: Naoto Ban; Hiroshi Kawashima, both of Shizuoka, Japan

[73] Assignee: Koito Manufacturing Co., Ltd., Tokyo, Japan

[21] Appl. No.: 288,388

[22] Filed: Aug. 3, 1994

Related U.S. Application Data

[63] Continuation of Ser. No. 998,039, Dec. 29, 1992, abandoned.

[30] Foreign Application Priority Data

Jan. 6, 1992 [JP] Japan .................................... 4-018161

[51] Int. Cl.[6] ...................................................... B60Q 1/30

[52] U.S. Cl. ............................ 362/61; 362/297; 362/346

[58] Field of Search ............................ 362/61, 297, 304, 362/311, 346, 347, 348, 341

[56] References Cited

U.S. PATENT DOCUMENTS

| | | | |
|---|---|---|---|
| 1,517,322 | 12/1924 | Templin | 362/347 |
| 1,726,379 | 8/1929 | Benford . | |
| 1,903,417 | 4/1933 | Grant | 362/304 |
| 2,751,816 | 6/1956 | Strong | 362/341 |
| 3,700,883 | 10/1972 | Donohue et al. . | |
| 4,081,667 | 3/1978 | Lewin et al. . | |
| 4,143,412 | 3/1979 | Sassmannshausen | 362/297 |
| 4,417,300 | 11/1983 | Bodmer | 362/346 |
| 4,495,552 | 1/1985 | Graff . | |
| 4,608,512 | 8/1986 | Rakitsch . | |
| 4,704,661 | 11/1987 | Kosmatka | 362/61 |

FOREIGN PATENT DOCUMENTS

| | | | |
|---|---|---|---|
| 2140165 | 2/1973 | Denmark . | |
| 0313216 | 4/1989 | European Pat. Off. . | |
| 2107896 | 9/1971 | France . | |
| 1472560 | 1/1969 | Germany | 362/346 |
| 2829128 | 1/1980 | Germany | 362/346 |
| 0161769 | 12/1979 | Japan | 362/297 |
| 334891 | 9/1930 | United Kingdom | 362/302 |
| 487141 | 6/1938 | United Kingdom | 362/347 |
| 2252151 | 7/1992 | United Kingdom . | |

*Primary Examiner*—James C. Yeung
*Assistant Examiner*—Y. Quach
*Attorney, Agent, or Firm*—Sughrue, Mion, Zinn, Macpeak & Seas

[57] ABSTRACT

A lamp reflector for a lamp that conforms to a vehicle body shape and method of producing such reflector, including a die therefor. The lamp reflector comprises a plurality of reflecting sections disposed about an optical axis of the lamp. Significant differences in light distribution at the boundaries between the reflecting sections are avoided by using a fundamental surface K of a reflecting surface 3 that may be generated as a free surface so as to conform to a vehicle body shape. After a reference curve is set on the fundamental surface K, several points P, P, . . . are specified on the reference curve. A very small reflecting surface R is determined at the point P according to the law of reflection so that a ray emitted from a light source and made incident on the point P is reflected to become a ray in parallel with the optical axis. Then, a tangential plane T of the fundamental surface at the point P is determined, and an outer product W of a normal vector N_T of the tangential plane T and a normal vector $N_{13}$ R of the very small reflecting surface R is calculated. A closed curve is generated by performing vector control in which the outer product W is employed as its tangential vector at each reflection point P around the optical axis, and connecting the tangential vectors by spline approximation.

14 Claims, 8 Drawing Sheets

REFLECTOR FOR A VEHICULAR LAMP AND METHOD OF PRODUCING A DIE THEREFOR

This is a Continuation of application Ser. No. 07/998,039 filed Dec. 29, 1992, now abandoned.

BACKGROUND OF THE INVENTION

1. Field of the Invention

The present invention relates to reflectors for vehicular lamps, and is intended to provide a novel reflector for a vehicular lamp which can improve the lamp appearance and light distribution. The reflector avoids significant level differences at boundaries between reflecting sections, which originate from the division of the reflecting surface into reflecting sections in order to form a reflecting surface that conforms to a vehicle body shape. The invention further relates to a method of producing a die for such a reflector.

2. Description of the Background Art

As a recent trend, rounded or streamlined vehicle body shapes are employed to satisfy the requirements for styling of vehicles in view of aerodynamic characteristics and design. It is necessary for a lamp shape to be designed, i.e., curved or inclined to the vertical direction, so as to conform to an external shape of a vehicle.

Influenced by this design trend, the design of reflecting surfaces cannot be limited to a single paraboloid of revolution. With a further trend of shifting the light distribution control function, which previously had been assigned to an outer lens, to a reflector, the reflecting surface is constituted, for instance, as a composite reflecting surface that is a combination of a plurality of paraboloids of revolution or very small reflecting surfaces.

As an example of such a design trend, FIG. 11 shows an appearance of a tail and stop lamp a of a vehicle, in which a stop lamp portion b and a turn signal lamp portion c are combined to form an integral part.

An outer lens e attached to a lamp body d has a shape in which the degree of its curve increases towards the corner of the vehicle, and which is slightly inclined with respect to the vertical direction.

FIG. 12 shows the main part of a reflector.

Like the outer lens e, which is designed to conform to the vehicle body shape, a reflector f consists of two reflecting portions g, g that are connected to each other so as to conform to the vehicle body shape. Reflecting surfaces h, h are formed by subjecting part of the lamp body d to a reflection treatment, i.e., evaporation.

Each reflecting surface h is divided into two parabolic reflecting sections i, i having different focal lengths.

Reference characters j, j denote bulb insertion holes formed at the centers of the respective reflecting portions g, g.

As long as the fundamental surface of the reflecting surface h is a curved surface that can be expressed as an analytical function like a paraboloid of revolution, it is difficult to obtain a shape that can freely accommodate various vehicle body shapes. As a result, level differences k, k are formed at the boundary between the reflecting sections i, i, i.e., at the connecting portions of the reflecting sections i, i that are located over and under the bulb insertion hole j.

FIG. 13 shows part of an inner lens l as disposed in the lamp. Several cylindrical lens steps n, n, . . . extending in the horizontal direction are formed on the back surface of a bottom portion m of the inner lens l, and fisheye steps q, q, . . . are formed on the back surface of an upper portion o.

In the lamp a as described above, the level differences k, k at the boundary between the reflecting sections i, i will cause a problem in that the lamp appearance is deteriorated by the level differences k, k seen through the outer lens e while the lamp a is turned on.

In particular, this phenomenon is conspicuous at the part of the level differences k that correspond to the bottom portion m of the inner lens l. Specifically, at that part, as indicated by circles of a broken line in FIG. 11, dark streaks s corresponding to the level differences k appear on the surface of the outer lens e and are very noticeable.

To solve the above problem, various methods are used conventionally. For example, to avoid formation of the level differences, one may forcibly design the reflecting surface h as a smooth surface while recognizing a possibility that the lower half of the reflecting surface h may deviate from a paraboloid surface. Alternatively, the surface at the level difference may be made a slanting surface, or the inner lens l may be subjected to roughening (e.g., sandblasting). However, either method is an individual measure, and cannot be the best method because eventually an influence (i.e., scattered light by the surface at the level difference or the roughened surface) on the light distribution control should be considered.

SUMMARY OF THE INVENTION

In order to solve the above problems, according to the invention, in a reflector for a vehicular lamp in which a reflecting surface is constituted of a large number of reflecting steps formed around an optical axis of the reflector, a fundamental surface of the reflecting surface is produced as a free surface. Then, the reflecting steps are arranged on the fundamental surface so that a tangential vector of a very small reflecting surface at a reflection point on the reflecting step is in the same direction as an outer product of a normal vector of the very small reflecting surface at the reflection point and a normal vector of a tangential plane of the fundamental surface at the reflection point.

Further, according to the invention, in a method of producing a die for forming a reflector for a vehicular lamp in which a reflecting surface is constituted of a large number of reflecting steps formed around an optical axis of the reflector, a fundamental surface of the reflecting surface is first produced as a free surface so as to conform to a vehicle body shape. Next, a reference curve is set on the fundamental surface, and a plurality of reflection points are specified on the reference curve.

Then, according to the law of reflection, a very small reflecting surface at the reflection point is determined so that a ray emitted from a light source and made incident on the reflection point travels in parallel with the optical axis after reflection at the reflection point. Next, a closed curve is generated by spline approximation in which direction vectors indicating a forming direction of the reflecting step at a plurality of reflection points around the optical axis are made tangential vectors of the closed curve, while a vector calculated as an outer product of a normal vector of the very small reflecting surface at the reflection point and a normal vector of the fundamental surface at the reflection point is employed as the direction vector. Finally, a V-shaped groove having a slanting surface that corresponds to the very small reflecting surfaces at the respective reflection points is formed on a die workpiece block along the closed curve.

DESCRIPTION OF THE PREFERRED EMBODIMENTS

According to the invention, a reference curve is drawn on the fundamental surface of a reflecting surface, and a plurality of points are specified on the reference curve. Then, a very small reflecting surface is determined according to the law of reflection so that a reflected ray from a reflection point on that small surface will be in parallel with the optical axis of the reflecting surface. Then, a closed curve is generated as a spline curve by employing, as a tangential vector, the vector calculated as the outer product of (i) the normal vector of the very small reflecting surface and (ii) the normal vector of the fundamental surface at that point.

In order to produce the proper geometry on the reflecting surface, a V-shaped groove is formed on a die workpiece block so that it lies coincident with the closed curve. Thus, when the reflecting steps on the reflector are formed by the die, the steps will be formed around the optical axis.

As a result, when the reflecting surface is viewed along the optical axis, it is not divided into a plurality of reflecting sections. Even if the fundamental shape of the reflecting surface is designed freely to some extent, e.g., according to a CAD system so as to conform to a vehicle body shape, the problem with an unacceptable appearance of the lamp due to visible level differences at the boundaries between the reflecting sections, and the problem with poor light distribution due to the light reflected from the level difference portions, can be avoided.

A reflector for a vehicle lamp and a method of producing a die therefor according to the present invention is described by way of an embodiment accompanied by the drawings.

Figure 10:
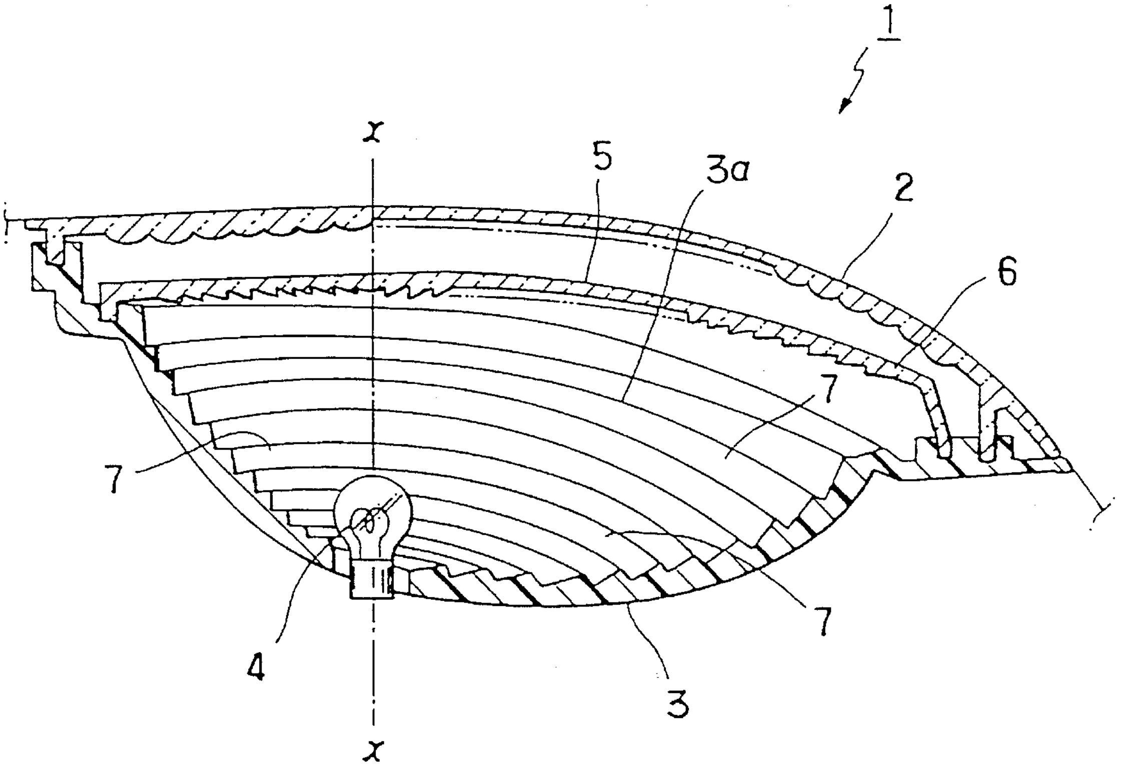
FIG. 10 is a sectional view schematically showing an example of a vehicular lamp according to the present invention.
Figure 11:
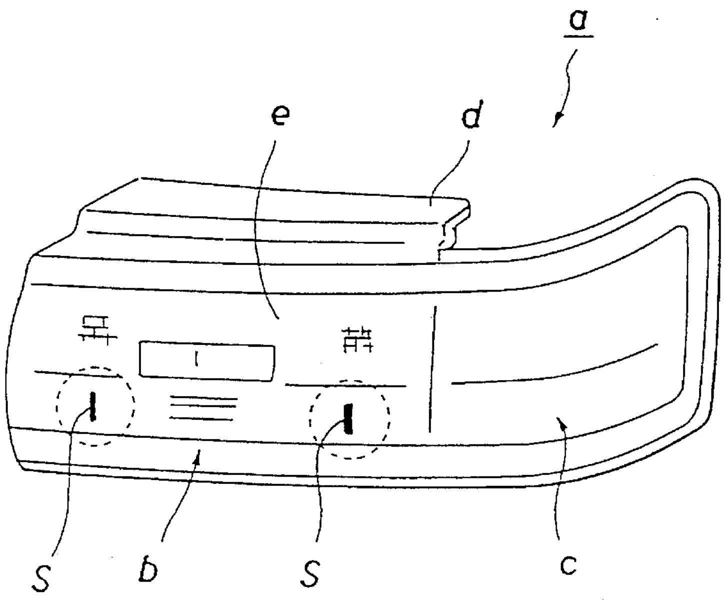
FIG. 11 PRIOR ART
FIG. 11 is a perspective view showing an example of a conventional vehicle lamp.
Figure 12:
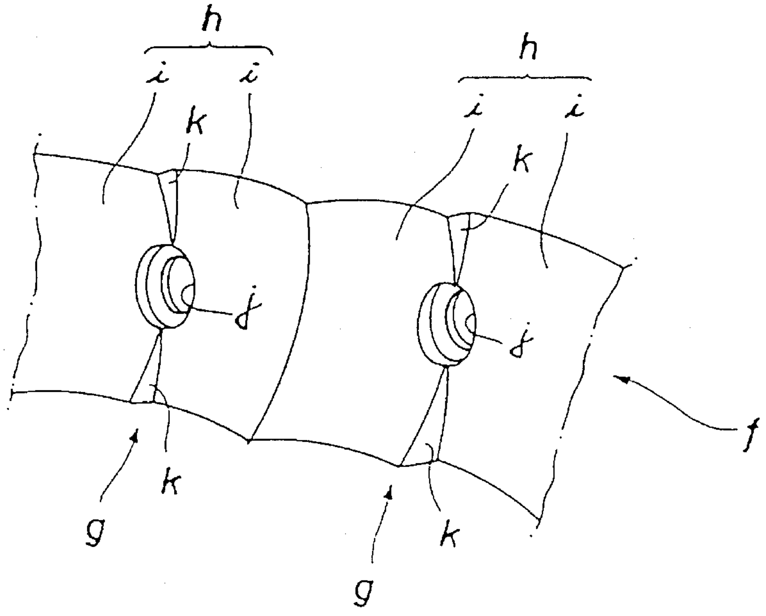
FIG. 12 PRIOR ART
FIG. 12 is a perspective view showing the main part of a conventional reflector.
Figure 13:
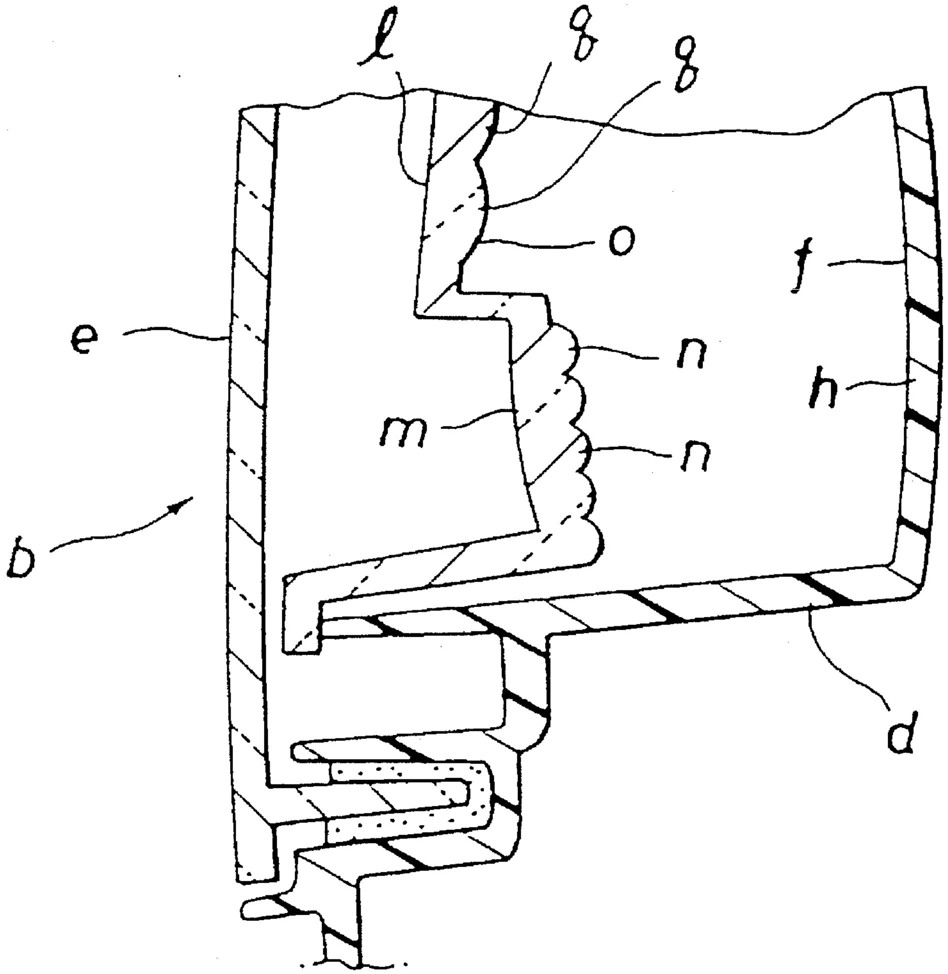
FIG. 13 PRIOR ART
FIG. 13 is an enlarged sectional view showing the main part of the conventional vehicle lamp of FIG. 11.

FIG. 10 shows an example in which the invention is applied to a tail lamp of a vehicle.

As shown in FIG. 10, a lamp 1 is designed so that a lens surface of an outer lens 2 is curved so as to conform to a vehicle body shape.

In a reflector 3 of the lamp 1, the optical axis x—x extends in the front-rear direction of the vehicle and passes through the center of a filament of a bulb 4, and an inner lens 5 is provided between the bulb 4 and the outer lens 2.

Disposed immediately inside the outer lens 2, the inner lens 5, like the outer lens 2, is influenced by the vehicle body shape to have a curved lens surface 6.

As shown in FIG. 10, a reflecting surface **3*a* of the reflector 3 is what is called a composite reflecting surface consisting of a large number of reflecting steps 7, 7, . . . A fundamental surface of the reflecting surface 3*a*** is designed so as to conform to the vehicle body shape.

FIGS. 1–5 show, on a step-by-step basis, a method of producing a die for the reflecting steps 7, 7, . . . A cross-section of a reflecting step 7 (obtained when the reflecting step is cut by a plane including the optical axis x—x) has a triangular shape. As is apparent from this fact, a die is produced by forming, by NC machining, a V-shaped-groove that corresponds to the reflecting step.

FIGS. 6–9 schematically illustrate the formation of the reflecting steps 7, 7, . . .

Figure 6:
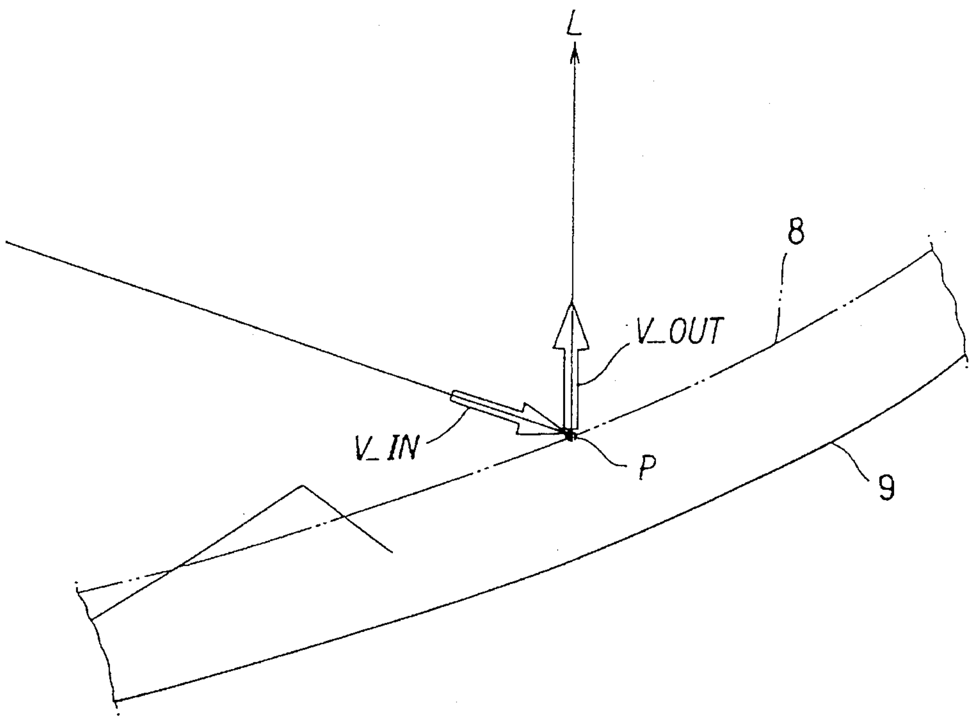
FIG. 6 is an optical path diagram showing an incident ray and a reflected ray at the reflection point P.
Figure 7:
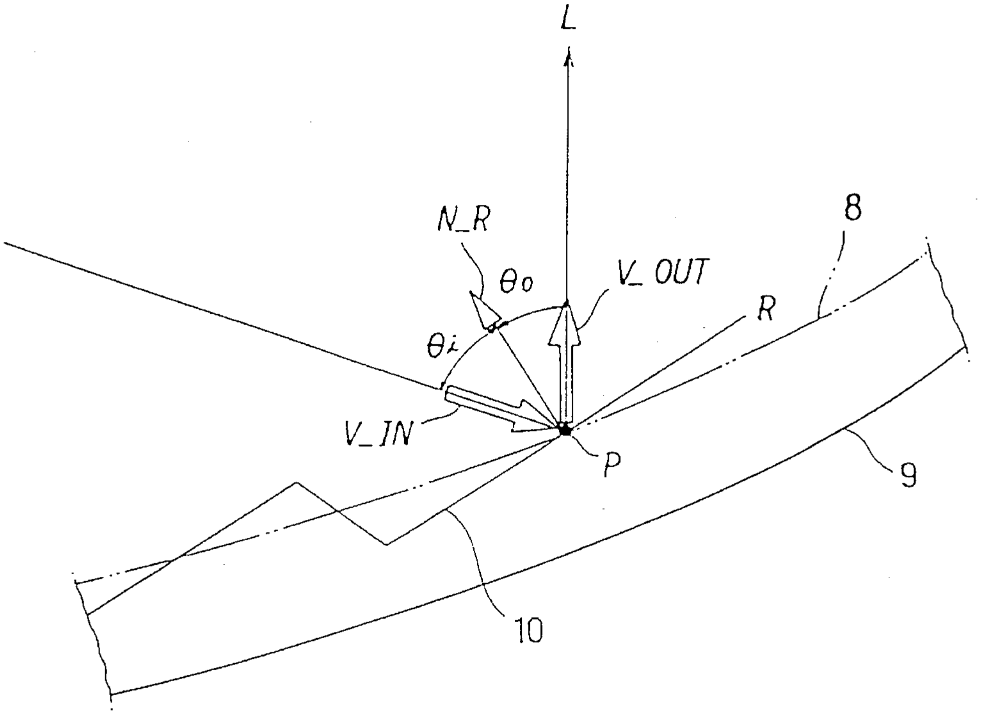
FIG. 7 is a drawing showing the very small reflecting surface R at the reflection point P and a normal vector thereof.
Figure 8:
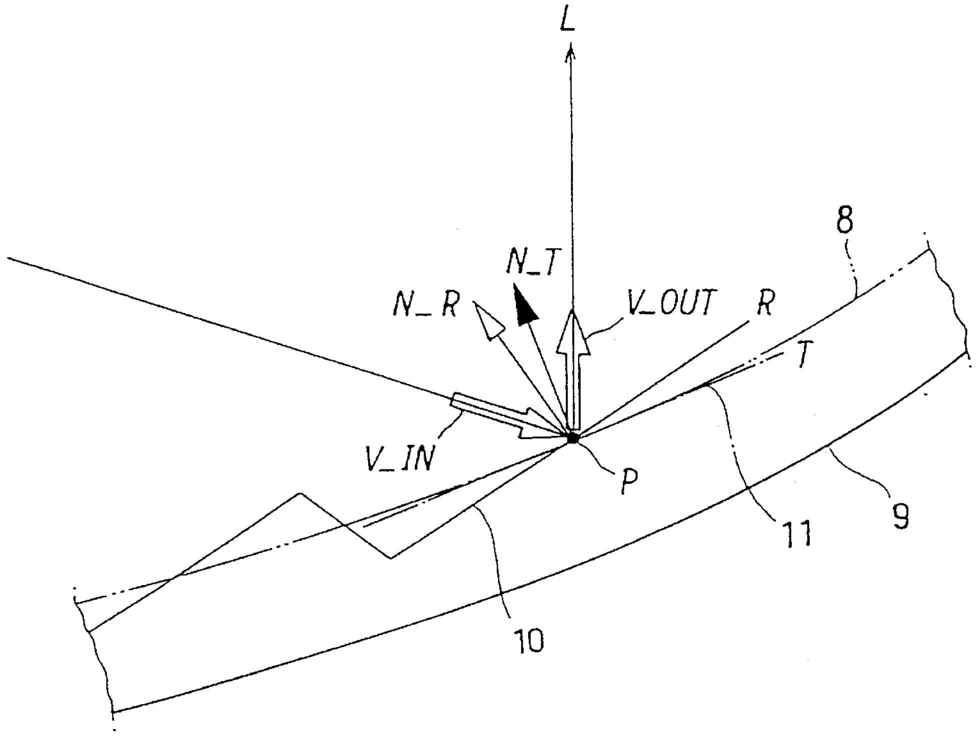
FIG. 8 is a drawing showing a tangential plane of the fundamental surface and a normal vector thereof at the reflection point P, together with the very small reflecting surface R and a normal vector thereof at the reflection point P.

A curved surface K shown in FIGS. 1–4 is a fundamental surface of the reflecting surface **3*a*. In FIGS. 6–8, a reference curve 8 indicated by a two-dot chain line represents the fundamental surface K, and a curve 9 indicated by a solid line represents an outer surface of the reflector 3. The shapes of the curves 8 and 9** are similar to each other.

The curves 8 and 9 are intersection lines obtained when the reflector 3 is cut by a plane including the optical axis x—x, and are given first as shapes conforming to the vehicle body shape.

Figure 2:
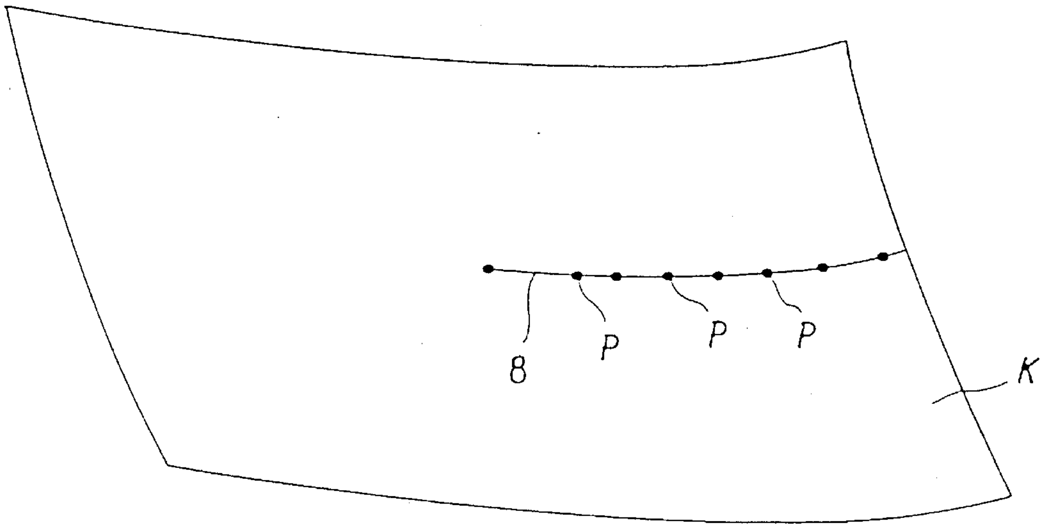
FIG. 2 is a drawing showing a state in which a plurality of points P are specified on the reference curve of FIG. 1.
Figure 3:
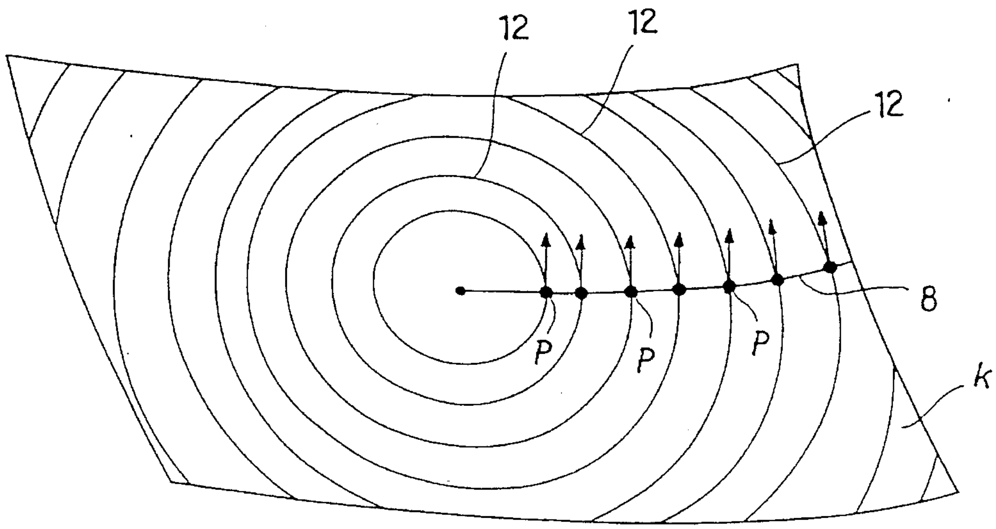
FIG. 3 is a drawing showing tangential vectors at the points P of a closed curve on the fundamental surface.
Figure 4:
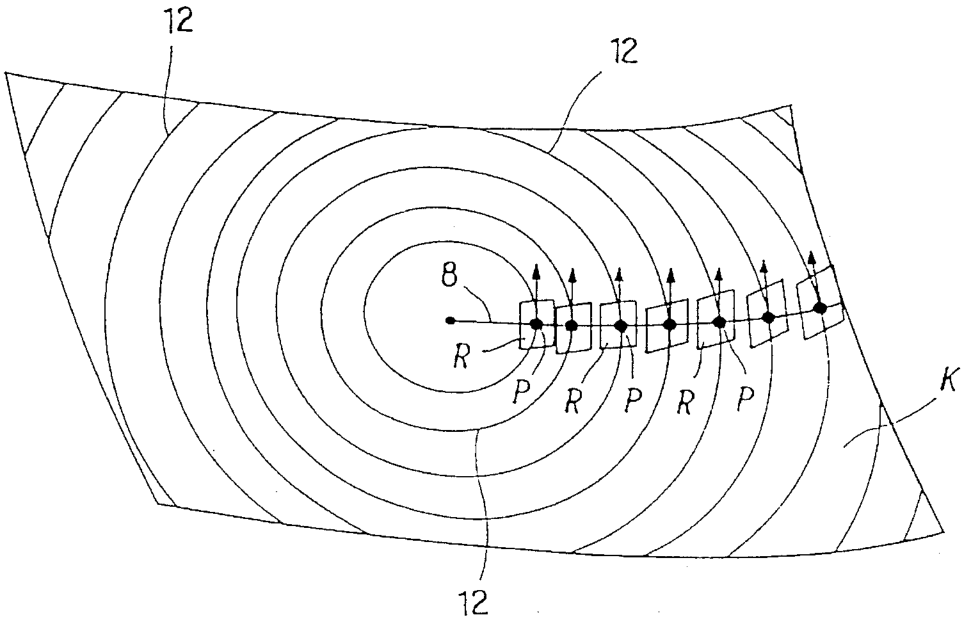
FIG. 4 is a drawing showing very small reflecting surfaces R at the points P on the reference curve of FIG. 3.

Points P on the reference curve 8 are reflection points. FIGS. 2–4 show how a plurality of points P are specified on the reference curve 8. FIGS. 6–9 show an optical path related to a particular one of the reflection points P, P, . . .

In FIGS. 6–9, a vector V_IN is a direction vector of an incident ray and a vector V_OUT is a direction vector of a reflected ray. A very small reflecting surface R at the point P on the fundamental surface K is represented by a line segment 10. A vector N_R is a normal vector of the very small reflecting surface R at the reflection point P. Reference character T denotes a tangential plane at the point P on the reference curve 8, and numeral 11 denotes a line segment representing the tangential plane T. A vector N_T is a normal vector of the tangential plane T at the point P.

Figure 1:
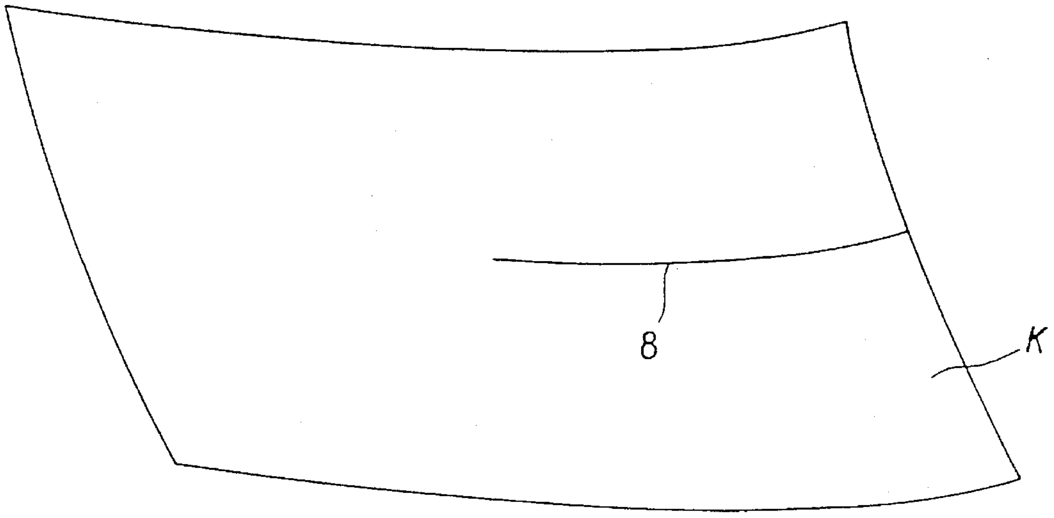
FIG. 1 is a drawing showing a state in which a reference curve is drawn on a free surface as a fundamental surface.

The first step in the process of designing a stepped reflecting surface and die therefor is as shown in FIG. 1. There, the fundamental surface K of the reflecting surface **3*a* is generated on a CAD system so as to conform to the vehicle body shape, and the reference curve 8** is drawn on the fundamental surface K. In general, the fundamental surface K is a free surface that cannot be expressed as an analytical function.

Then, as shown in FIG. 2, a plurality of points P, P, . . . are set on the reference curve 8, which serve as start points to be used in obtaining a closed curve described later. The start point of the reference curve 8 is the intersection of the fundamental surface K and the optical axis x—x.

FIG. 6 shows an optical path of reflection at one of the points P, P, . . . As shown by an optical path L, if it is required that a ray reflected from the point P be in parallel with the optical axis x—x, the slope of the very small reflecting surface R is uniquely determined according to the law of reflection.

That is, as shown in FIG. 7, the very small reflecting surface R is determined so that an incident angle $\theta_i$ and a reflection angle $\theta_o$ with respect to the normal vector N_R of the reflecting surface R become identical.

Then, as shown in FIG. 8, the normal vector N_T of the tangential plane T at the reflection point P on the fundamental surface K is calculated, and an outer product (vector product) W of the normal vector N_T and the normal vector N_R of the very small reflecting surface R is then calculated.

That is, a very small surface element at the point P on the fundamental surface K is approximated by the tangential plane T at the point P and, using the vector W, the shape of the fundamental surface K is made reflective by the direction of forming the very small reflecting surface R.

FIG. 3 shows a closed curve 12 as a spline curve obtained by employing, as its tangential vectors, the vectors W that are sequentially determined at the respective reflection points around the optical axis x—x starting from a certain point P.

The closed curves 12, 12, . . . generated for the respective start points P have the optical axis x—x as their center line, and serve as reference curves for machining a die for the reflecting steps. In general, the closed curves are not circular when viewed along the optical axis x—x.

Figure 9:
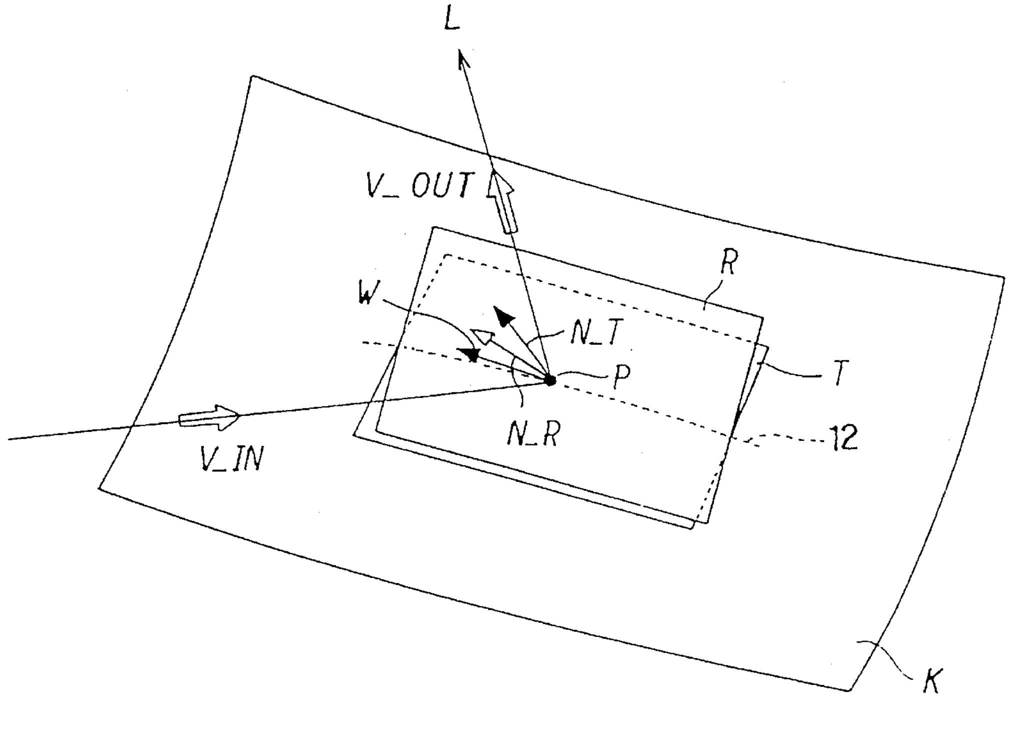
FIG. 9 is a perspective view showing a relationship among the very small reflecting surface R and tangential plane T at the point P, and respective normal vectors and an outer product thereof.

FIG. 9 is a perspective view showing a spatial relationship among the fundamental surface K, the very small reflecting surface R, the tangential plane T and various vectors. The above procedure is summarized by itemization as follows.

Step (1)

The fundamental surface K of the reflecting surface 3*a* is generated, as shown in FIG. 1.

Step (2)

The reference curve 8 is specified on the fundamental surface K, as shown in FIG. 1.

Step (3) The start points P, P, . . . are set on the reference curve 8, as shown in FIG. 2.

Step (4)

The closed curves 12, 12, . . . are generated for the respective start points P, P, . . ., as shown in FIG. 3.

In more detail, the following procedure is performed using a technique of approximating the very small surface element on the fundamental surface K by the tangential plane T at the reflection point.

Step (4-1)

The very small reflecting surface R is determined by calculating the normal vector N_R of the very small reflecting surface R based on the vector V_I of the incident ray and the vector V_OUT of the reflected ray at the point P, as shown in FIG. 7.

Step (4-2)

The normal vector N_T of the fundamental surface K and the tangential plane T at the point P is determined, as shown in FIG. 8.

Step (4-3)

The vector W is determined as the outer product of the normal vectors N_R and N_T, as shown in FIG. 9. Step (4-4)

The closed curve 12 is obtained according to the spline approximation (interpolation) by employing, as its tangential vectors, the vectors W at the respective reflection points around the optical axis x—x, as shown in FIG. 3.

Step (4-5)

Steps (4-1) through (4-4) are repeated with respect to the respective start points P on the reference curve 8. Final step (5)

The reflecting steps are produced with respect to the respective closed curves 12, 12, . . .

That is, as shown in FIG. 4, a continuous reflecting surface relating to one reflecting step is formed by connecting, along the closed curve 12, the very small reflecting surfaces R that are formed with respect to the fundamental surface K, to ensure that rays emitted from a light source and made incident on the reflecting step travel in parallel with the optical axis x—x after the reflection.

Figure 5:
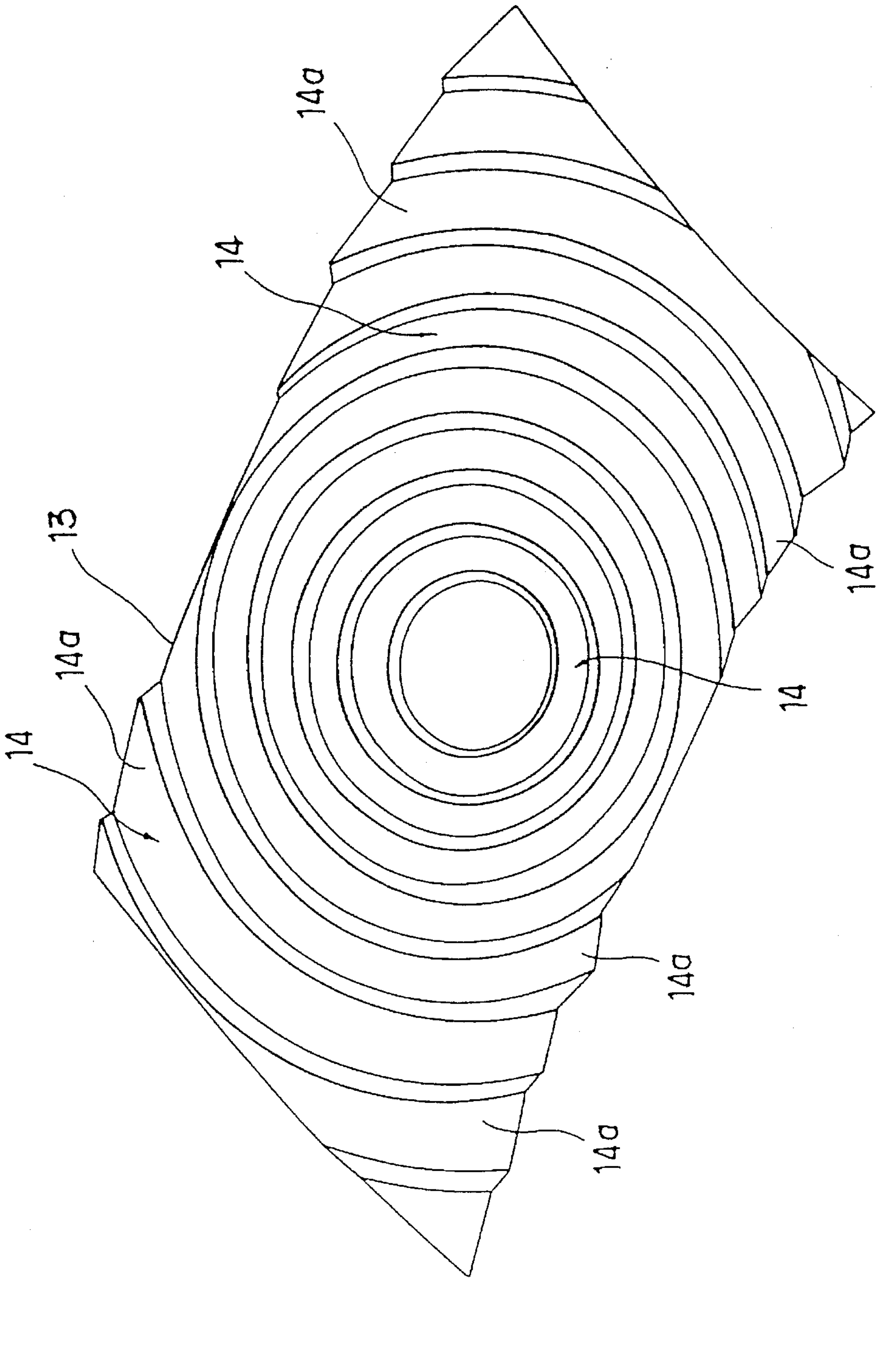
FIG. 5 is a drawing showing V-shaped grooves on a die that correspond to reflecting surfaces of reflecting steps.

FIG. 5 shows V-shaped grooves 14, 14, . . . that are formed on a die workpiece block 13 while the movement of a cutting tool is controlled along the closed curves 12, 12, As shown in FIG. 5, the surface of the die workpiece block 13 has a shape corresponding to the fundamental surface K of the reflecting surface 3, and the inside slanting surface 14*a*of the V-shaped groove 14 relates to formation of the reflecting surface of the reflecting step 7. The angle formed by the outside slanting surface of the V-shaped groove 14 and the optical axis x—x is made constant in view of convenience of the die extraction.

Thus, in the reflector 3 as described above, as is apparent from the process of forming the reflecting steps 7, 7, . . . , the very small reflecting surface R is determined based on the fundamental surface K having a shape conforming to the vehicle body shape so that the rays reflected from the respective reflection points are directed in parallel with the optical axis x—x. The forming directions of the very small reflecting surfaces R are determined by the vectors W, and each reflecting step is formed as a continuous surface connecting these very small reflecting surfaces R. Therefore, when the reflecting surface 3 is viewed from the front side, the respective reflecting steps 7, 7, . . . are formed around the optical axis x—x so as to assume a loop form while the reflecting surface 3 is not divided into a plurality of reflecting sections with respect to the optical axis x—x in terms of the light distribution control function. As a result, the precise light path control can be performed in accordance with the fundamental shape of the reflecting surface 3*a* without causing significant level differences at the boundaries between the reflecting sections.

As is apparent from the above description, in the reflector for a vehicular lamp and a method of producing a die therefor according to the invention, the reflecting steps can be designed such that the fundamental surface of the reflecting surface is first determined in accordance with the vehicle body shape, and then the very small reflecting surfaces at the respective reflection points are connected in a loop form around the optical axis so that the reflected rays from the reflecting step become parallel rays. Therefore, there can be avoided the deterioration in appearance and the bad influence on the light distribution control which would otherwise be caused by the significant level differences at the boundaries that occur where the reflecting surface is divided into a plurality of reflecting sections.

What is claimed is:

1. A reflector for a vehicle lamp and having an optical axis, comprising:

a reflecting surface constituted of a plurality of reflecting steps formed around the optical axis of the reflector, wherein at least one of said steps is produced from a fundamental surface comprising a free surface adjacent to at least one portion of a vehicle body, said free surface conforming in shape to said at least one portion of a vehicle body adjacent said fundamental surface, and wherein said reflecting step is arranged on said fundamental surface so that a tangential vector of a very small reflecting surface at a reflection point on said reflecting step is in a same direction as an outer product of a normal vector of the very small reflecting surface at the reflection point and a normal vector of a tangential plane of said fundamental surface at said reflection point.

2. The reflector as set forth in claim 1 wherein said plurality of reflecting step comprise closed curves that are disposed about said optical axis.

3. A vehicle lamp comprising:

a light source, a lens means disposed between said light source and a position of external visibility, and a reflector defining an optical axis in a direction of external visibility, said reflector comprising a reflecting surface having at least one reflecting step disposed with respect to said optical axis, said reflecting step being arranged on a fundamental surface so that a tangential vector of a very small reflecting surface at a reflection point on said reflecting step is in a same direction as an outer product of a normal vector of the very small reflecting surface at the reflection point and a normal vector of a tangential plane of said fundamental surface at said reflection point, said fundamental surface being a free surface adjacent to at least one portion of a vehicle body and conforming in shape to said at least one portion of a vehicle body.

4. The vehicle lamp as set forth in claim 3 wherein a plurality of said reflecting steps are provided.

5. The vehicle lamp as set forth in claim 4 wherein said plurality of reflecting steps comprise closed curves that are disposed about said optical axis.

6. The vehicle lamp as set forth in claim 5 wherein said closed curves are not circular when viewed along said optical axis.

7. A method of producing a reflector for a vehicular lamp in which a reflecting surface is constituted of a large number of reflecting steps formed around an optical axis of the reflector, comprising the steps of:

(1) generating a fundamental surface of the reflecting surface as a free surface so that the fundamental surface conforms in shape to at least one portion of a vehicle body adjacent said fundamental surface;

(2) setting a reference curve on the fundamental surface;

(3) specifying a plurality of reflection points on the reference curve of step (2);

(4) determining a very small reflecting surface at each reflection point of step (3) so that a ray emitted from a light source and made incident on the reflection point travels in parallel with the optical axis after reflection at the reflection point, and generating a closed curve by spline approximation, wherein, in said approximation, direction vectors indicating a forming direction of the reflecting step at a plurality of reflection points around the optical axis are made tangential vectors of the closed curve, while employing, as the direction vector, a vector calculated as an outer product of a normal vector of the very small reflecting surface at the reflection point and a normal vector of a tangential plane of the fundamental surface at the reflection point;

(5) forming, on a die workpiece block along the closed curve of step (4), a V-shaped groove having a surface that corresponds to the very small reflecting surfaces at the respective reflection points; and (6) using said die to form a reflector.

8. A method of producing a die for use in forming a reflector for a vehicular lamp in which a reflecting surface is constituted of a large number of reflecting steps formed around an optical axis of the reflector, comprising the steps of:

(1) generating a fundamental surface of the reflecting surface as a free surface so that the fundamental surface conforms in shape to at least one portion of a vehicle body adjacent said fundamental surface;

(2) setting a reference curve on the fundamental surface;

(3) specifying a plurality of reflection points on the reference curve of step (2);

(4) determining a very small reflecting surface at the reflection point of step (3) so that a ray emitted from a light source and made incident on the reflection point travels in parallel with the optical axis after reflection at the reflection point, and generating a closed curve by spline approximation, wherein, in said spline approximation, direction vectors indicating a forming direction of the reflecting step at a plurality of reflection points around the optical axis are made tangential vectors of the closed curve, while employing, as the direction vector, a vector calculated as an outer product of a normal vector of the very small reflecting surface at the reflection point and a normal vector of a tangential plane of the fundamental surface at the reflection point; and (5) forming, on a die workpiece block along the closed curve of step (4), a V-shaped groove having a surface that corresponds to the very small reflecting surfaces at the respective reflection points.

9. A vehicle lamp for mounting on a vehicle body comprising:

a light source;

lens means disposed between said light source and a position of external visibility; and a reflector defining an optical axis in a direction of external visibility, said reflector comprising a reflecting surface having at least one reflecting step disposed with respect to said optical axis, each said reflecting step being arranged on a fundamental surface and comprising a closed curve that is substantially not circular when viewed along said optical axis, said fundamental surface being a free surface adjacent to at least one portion of a vehicle body, said free surface conforming in shape to at least one portion of the vehicular body adjacent to said fundamental surface.

10. The vehicle lamp as set forth in claim 9, wherein said free surface has a shape which is not definable by an analytical function.

11. The vehicle lamp as set forth in claim 9, wherein rays reflected by said at least one reflecting step are substantially parallel with said optical axis.

12. The vehicle lamp as set forth in claim 9 wherein said reflecting surface comprises a plurality of reflecting steps, each disposed so that its closed curve is concentric with respect to said optical axis.

13. A vehicle lamp comprising:

a light source;

lens means disposed between said light source and a position of external visibility; and a reflector having an optical axis, said reflector comprising a reflecting surface forming on a fundamental surface, said fundamental surface being a smooth, free surface that is asymmetrical in a plane including said optical axis, said reflecting surface comprising a number of reflecting steps that form non-circular loops and reflect light rays emitted from said light source to directions substantially parallel with said optical axis.

14. The vehicle lamp set forth in claim 13, wherein said reflector has a portion where intervals of said loops increase as distance from said light source increases.

* * * * *